United States Patent
Tweedie et al.

(10) Patent No.: US 12,346,087 B2
(45) Date of Patent: Jul. 1, 2025

(54) SYSTEM AND METHOD FOR CONTINUOUS MACHINE MONITORING AT A KHz-SCALE

(71) Applicant: MACHINEMETRICS, INC., Northampton, MA (US)

(72) Inventors: Brock Tweedie, Belchertown, MA (US); Lou Zhang, Northampton, MA (US)

(73) Assignee: Machinemetrics, Inc., Northampton, MA (US)

( * ) Notice: Subject to any disclaimer, the term of this patent is extended or adjusted under 35 U.S.C. 154(b) by 816 days.

(21) Appl. No.: 17/112,306

(22) Filed: Dec. 4, 2020

(65) Prior Publication Data
US 2022/0179392 A1   Jun. 9, 2022

(51) Int. Cl.
  *G05B 19/406* (2006.01)
  *G01M 99/00* (2011.01)

(52) U.S. Cl.
  CPC ......... *G05B 19/406* (2013.01); *G01M 99/005* (2013.01); *G05B 2219/33099* (2013.01); *G05B 2219/37533* (2013.01)

(58) Field of Classification Search
  None
  See application file for complete search history.

(56) References Cited

U.S. PATENT DOCUMENTS

| | | | |
|---|---|---|---|
| 3,878,983 A | 4/1975 | Hamill, III et al. | |
| 4,908,746 A * | 3/1990 | Vaughn | G05B 19/058 700/18 |
| 5,212,645 A * | 5/1993 | Wildes | G05B 19/4148 702/145 |
| 5,212,798 A * | 5/1993 | Kanda | G11B 19/02 |
| 5,243,533 A * | 9/1993 | Takagi | G05B 19/4065 318/565 |
| 5,546,533 A | 8/1996 | Koyama | |
| 5,701,830 A | 12/1997 | Muto | |
| 5,927,874 A | 7/1999 | Kikuta et al. | |
| 7,647,131 B1 * | 1/2010 | Sadowski | G05B 23/0297 702/181 |
| 10,331,324 B1 * | 6/2019 | Wilson | A61B 5/7445 |
| 2003/0014498 A1 * | 1/2003 | Kreidler | G05B 19/4063 709/217 |
| 2007/0150235 A1 * | 6/2007 | Lev-Ami | G05B 19/41875 702/182 |
| 2012/0116547 A1 * | 5/2012 | Shigehara | G05B 19/0428 700/83 |
| 2013/0091335 A1 | 4/2013 | Mulcahy et al. | |
| 2013/0112893 A1 * | 5/2013 | Miyake | G01N 23/00 250/306 |
| 2016/0127514 A1 * | 5/2016 | Maksumov | H04L 69/08 709/202 |
| 2017/0076072 A1 | 3/2017 | Koren | |

(Continued)

*Primary Examiner* — Jennifer L Norton
(74) *Attorney, Agent, or Firm* — Grogan, Tuccillo & Vanderleeden, LLP (57) ABSTRACT

A device and a method of monitoring a condition of a machine in real time. The method includes: interfacing an edge device with the machine; requesting a handle from a controller of the machine; querying the machine with an adapter of the edge device for a control data; and acquiring control data from one or more sensors of the machine. The method includes repeating the steps of querying the control data and acquiring the control data after a period of time at a high frequency.

13 Claims, 5 Drawing Sheets

(56) References Cited

U.S. PATENT DOCUMENTS

| | | | |
|---|---|---|---|
| 2017/0097621 A1* | 4/2017 | Ackmann | G05B 15/02 |
| 2017/0277615 A1* | 9/2017 | Hitchcock | G06F 11/3065 |
| 2018/0129191 A1* | 5/2018 | Rodriguez | G05B 19/4063 |
| 2018/0284742 A1* | 10/2018 | Cella | G05B 23/0286 |
| 2019/0064787 A1* | 2/2019 | Maturana | G05B 23/0227 |
| 2019/0265661 A1* | 8/2019 | Sakellariadis | G06F 16/951 |
| 2019/0287315 A1* | 9/2019 | Pretini | G07C 3/12 |
| 2019/0379639 A1* | 12/2019 | Corning | H04L 63/0485 |
| 2020/0019155 A1* | 1/2020 | Cella | G06N 3/02 |
| 2020/0041989 A1* | 2/2020 | Zhang | G05B 19/4065 |
| 2020/0106377 A1* | 4/2020 | Xu | H02P 21/13 |
| 2020/0117510 A1* | 4/2020 | Kondiles | G06F 16/901 |
| 2020/0242055 A1* | 7/2020 | Raj S V | G06F 3/061 |
| 2020/0304342 A1* | 9/2020 | Qian | H04L 67/56 |
| 2021/0004265 A1 | 1/2021 | Guim Bernat et al. | |
| 2021/0194965 A1* | 6/2021 | Crowne | H04L 67/10 |
| 2021/0208992 A1 | 7/2021 | Vega et al. | |
| 2021/0342309 A1* | 11/2021 | Madhipatla | G06F 16/188 |
| 2022/0284306 A1 | 9/2022 | Osogami et al. | |
| 2023/0213902 A1* | 7/2023 | Galvez | H04L 67/10 |
| | | | 700/275 |
| 2023/0246581 A1* | 8/2023 | Dubber | H02P 29/02 |
| | | | 700/28 |

* cited by examiner

SYSTEM AND METHOD FOR CONTINUOUS MACHINE MONITORING AT A KHz-SCALE

BACKGROUND

Technical Field

Embodiments of the invention relate generally to the monitoring of machines to allow for preventative maintenance in manufacturing processes and to prevent waste, and more specifically, to a system and method for high frequency monitoring of machine control data.

Discussion of Art

In the machining space, it is generally important to detect various metrics of a machine to determine if the machine is performing in an anomalous way, i.e., in a manner outside the normal and/or intended operating parameters/metrics of the machine, e.g., in a manner that may result in a defective part. It is, however, usually difficult to monitor the machine metrics at a high frequency in order to allow for monitoring of some condition-based metrics, e.g., spindle load. For example, several traditional systems and methods for monitoring metrics of a machine interpret low frequency control data at specific locations to monitor the motor temperature of a machine tool. This is possible because temperature does not fluctuate more than every half second.

The disadvantages of such traditional systems are clear for metrics that quickly change or that are based on multiple pieces of control data. Complex, condition-based metrics in particular, cannot be effectively measured at low frequencies. Low frequency control data collection does not accurately represent dynamic and continuous phenomenon on machines, i.e., a physical process on the machine that spans over a period of time and has nuanced, rapidly changing characteristics, e.g., the load on the machine as it cuts through a piece of metal.

Third party sensor installations to provide the high frequency control data are inefficient, prohibitively expensive, difficult to standardize, and subject to degradation.

What is needed, therefore, is an improved system and method for the high frequency monitoring machine anomalies via control data supplied by sensors of the machine.

BRIEF DESCRIPTION

In an embodiment, a method of monitoring a condition of a machine in real time includes: interfacing an edge device with the machine; requesting a handle from a controller of the machine; querying the machine with an adapter of the edge device for a control data; acquiring control data from at least one sensor of the machine; and repeating the steps of querying the control data and acquiring the control data after a period of time at a high frequency as defined by a sampling rate. During an initial connection period, the adapter cycles through a set logic of repeating the steps of querying the machine and acquiring the control data to establish the sampling rate.

In another embodiment, a method of monitoring a condition of a machine in real time includes: interfacing an edge device with the machine; establishing communication between the edge device and the machine; activating a machine based application programming interface (API) with an adapter executed on the edge device; acquiring a data thread via selected API commands corresponding to waveform diagnostics data from the machine; and outputting data to the edge device. The acquiring is conducted at least at sampling rate in excess of 1 KHz and employs metrics programmatically configured based on a customizable protocol for each type of data.

In yet another embodiment, a peripheral edge device includes: a machine interface connector; a memory module; a data acquisition module; and a controller. The data acquisition module acquires a data thread via the machine interface connector corresponding to waveform diagnostics data from a machine and converts the waveform diagnostics data to a machine-readable format. The controller adapts the data acquisition module to acquire data from a machine via instructions obtained from the memory modules, acquires the machine readable waveform diagnostics data from the configured data acquisition module, alters the machine readable waveform diagnostics in accordance with instructions retrieved from the memory module, and outputs at least one of the altered and unprocessed machine readable waveform diagnostics data to the memory module. The controller is configured to initiate an action in a machine connected via the machine interface connector.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time", as used herein means a level of processing responsiveness that a user senses as sufficiently immediate or that enables the processor to keep up with an external process. As used herein, the term "control data" means any type of data which governs the behavior of a machine, e.g., speed data, feed rate data, load data.

As will be explained in greater detail below, the present invention provides for a continuous approach to querying and acquiring control data from sensors on the machine. In other words, some embodiments of the present invention provide an adapter that monitors a number of metrics, as measured by one or more sensors on the machine, at a high frequency sampling rate. The term "high frequency" with respect to the sample rate, as used herein, means a frequency at or greater than 1 kilohertz. The term "low frequency" with respect to the sample rate, as used herein, means a frequency less than 0.60 hertz.

As will be appreciated, embodiments of the present invention use domain knowledge, machine learning, to facilitate new ways of requesting and acquiring control data to break down a machining task/process into smaller pieces in order to continuously monitor a number of distinct machine metrics.

Further, while the embodiments disclosed herein are described with respect to the machining industry, it is to be understood that embodiments of the present invention may be applicable to other fields/systems/processes in which a device is subjected to repetitive stresses that may detrimentally affect end product quality.

Figure 1:
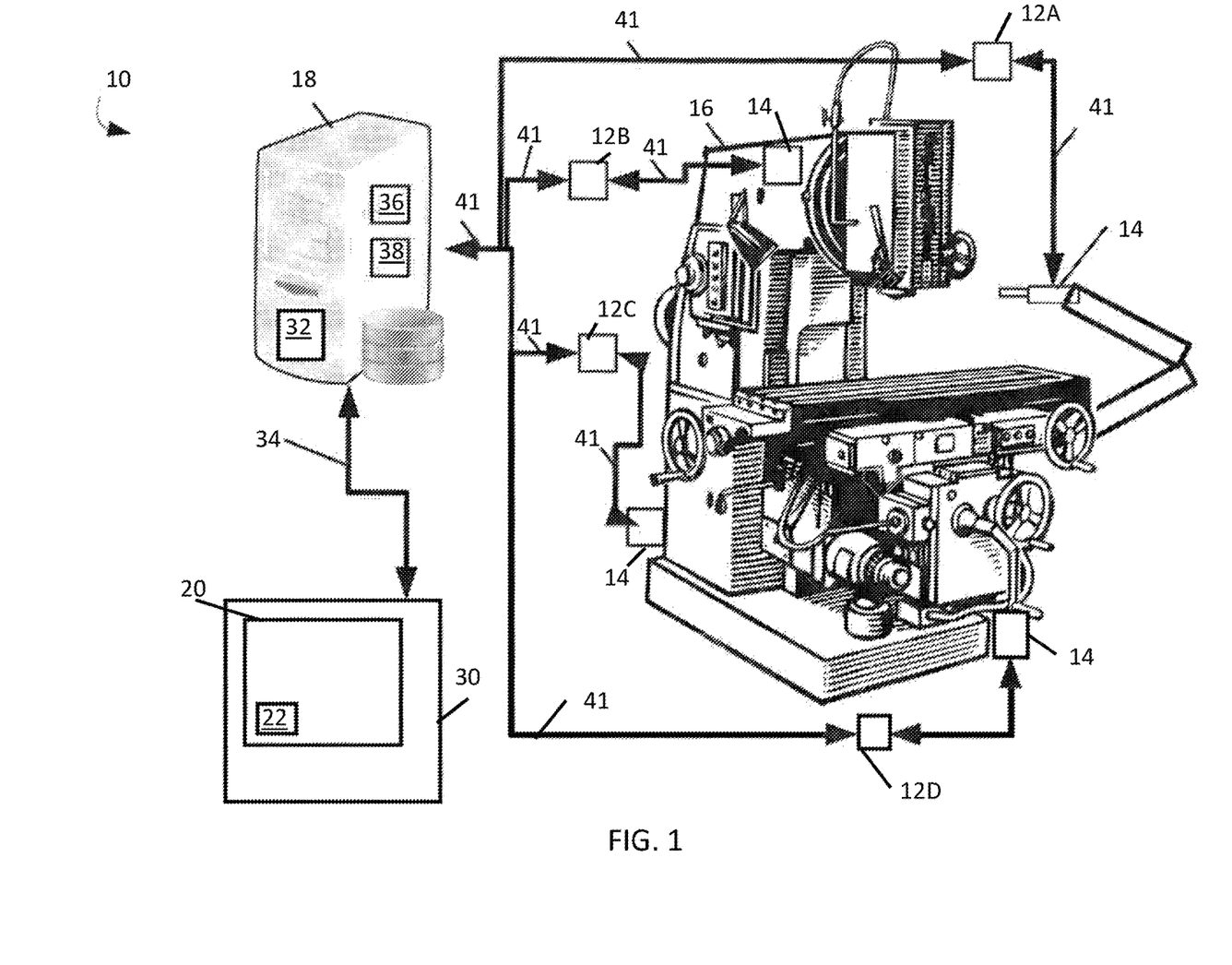
FIG. 1 is a diagram of a system for high frequency monitoring of machine metrics via control data, in accordance with an embodiment of the present invention.

Referring now to FIG. 1, the major components of a system 10 for monitoring machine metrics via control data 12A, 12B, 12C, 12D, in accordance with an embodiment of the present invention, are shown. The system 10 includes one or more sensors 14 operative to generate the control data 12A, 12B, 12C, 12D from a machine 16, and a controller 18 in electronic communication with the one or more sensors 14. As will be explained in greater detail below, the controller 18 is operative to receive the control data 12A, 12B, 12C, 12D from the one or more sensors 14. An adapter 20 in an edge device 30, which, in embodiments, may be in electronic communication with the controller 18 via one or more communication link 34, e.g., a wired connection such as ethernet, USB, serial or other suitable wired connection; and/or a wireless connection such as WiFi, cellular, or other suitable wireless connection.

The machine 16 may be any type of manufacturing device operative to generate/process a plurality of parts in a repetitive manner, e.g., a press, drill, saw, etc. The machine 16 may have one or more operating parameters/metrics such as load, speeds, feed rates, etc.

The one or more sensors 14 may include load sensors, speed sensors, feed rate sensors, etc. In embodiments, the one or more sensors 14 may be embedded/integrated into the machine 16, disposed on external surfaces of the machine, and/or disposed at a distance from the machine 16. The one or more sensors 14 may be mechanical, e.g., a spring-based load sensors, magnetic, e.g., a rotational pickup, optical, e.g., lasers, or other types of sensors that are operative to detect/sense control data 12A, 12B, 12C, 12D from the machine 16. In other words, the one or more sensors 14 may be any type of sensor that provides data concerning an operating parameter of the machine 16 used to control operation of the machine 16. For example, in embodiments, the one or more sensors 14 may be internal to the machine 16 and necessary for operation of the machine 16.

In embodiments, the one or more sensors 14 may further include a part counter, i.e., a device that detects when the machine 16 has finished processing/generating a part and/or tracks the number of parts made by the machine 16.

The controller 18 includes at least one processor 36 and a memory device 38. For example, in embodiments, the controller 18 may be a dedicated process logic controller ("PLC") or a general-purpose computer such as a desktop/laptop. The controller 18 may include, and/or electronically communicate with, a database 40 that stores the control data 12A, 12B, 12C, 12D. The controller 18 may be at the same site/location as the machine 16, or in embodiments, located at a different site from the machine 16. The controller 18 may electronically communicate with the one or more sensors 14 via communication link 41 which, like link 34, may be wired and/or wireless.

While FIG. 1 depicts the controller 18 and adapter 20 as apart from the machine 16, in embodiments, the controller 18 and/or adapter 20 may be integrated into the machine 16. Accordingly, in embodiments, the system 10 may further include the machine 16.

Figure 2:
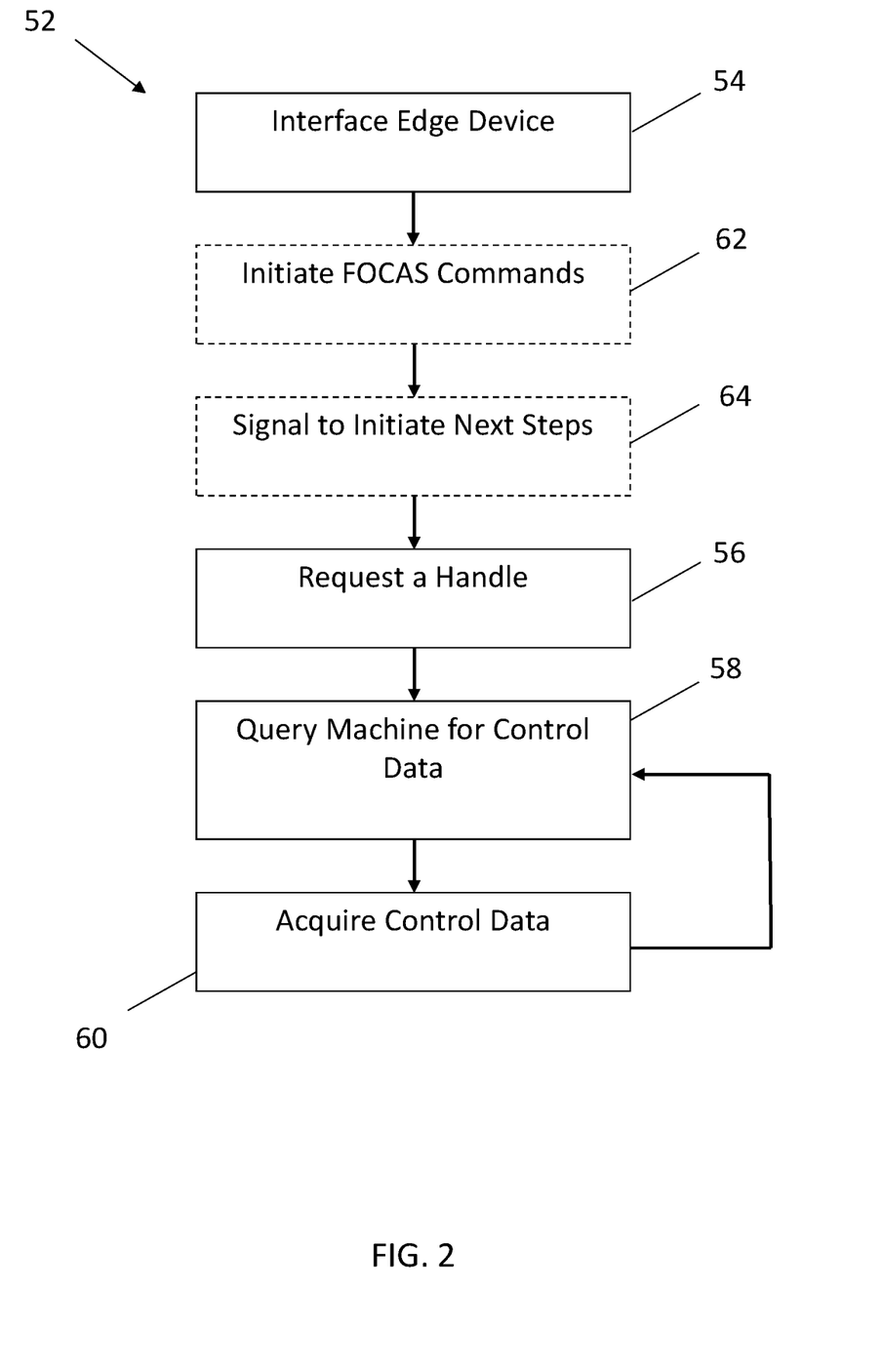
FIG. 2 is a flow chart depicting a method for high frequency monitoring machine of machine metrics via control data, in accordance with an embodiment of the present invention.

Turning now to FIG. 2, a method 52 for high frequency monitoring of machine metrics via control data utilizing the system 10, in accordance with an embodiment of the present invention, is shown. The method 52 includes: interfacing 54 an edge device 30 with the machine 16; requesting 56 a handle from the controller 18 of the machine 16; querying 58 the machine 16 with the adapter 20 of the edge device 30 for control data 12A, 12B, 12C, 12D; acquiring 60 control data 12A, 12B, 12C, 12D from one or more sensors 14 of the machine 16; and repeating the steps of querying 58 the control data 12A, 12B, 12C, 12D and acquiring 60 the control data 12A, 12B, 12C, 12D after a period of time at a high frequency defined by a sampling rate. The step of requesting 56 a handle from the controller 18 includes requesting a dedicated assignment of communication and memory resources by the controller 18 in order to implement the data querying 58 and acquiring 60 steps of the method 52. The step of requesting 56 a handle provides an identifier, to be used by the controller 18, associating the communication and memory resources with the adapter 20. During an initial connection period, the adapter 20 cycles through a set logic 22 of repeating the steps of querying 58 the machine 16 and acquiring 60 the control data 12A, 12B, 12C, 12D to establish the sampling rate.

Referring to FIG. 2, the logic 22 of the adapter 20 during the initial connection period obtains a first control data in the form of waveform diagnostics data 12A by initiating 62 a sequence of FOCAS (i.e., FANUC Open CNC API Specification) commands to prepare and initiate an onboard data collection buffer on the machine 16. Available or valid configurations of the waveform diagnostics data 12A depend on the specific machine 16. During the initial connecting period, the method 52 seeks to acquire 60 as many pieces of control data 12A, 12B, 12C, 12D indicating as many distinct metrics of the machine 16 without exceeding the sampling limitations of the machine 16. The logic 22 allows the method 52 to be customizable and to allow metrics that carry more direct physical information about the machining process, such as spindle speed and spindle torque, to be treated with a higher priority. The logic 22 attempts progressively less complicated configurations during initiating 62 the sequence of FOCAS commands until a valid configuration is obtained and then signals 64 to initiate the steps of querying 58 and acquiring control data 60 in the form of onboard waveform sampling of the machine 16. Invalid configurations return error codes from the controller 18.

In embodiments, the acquiring 60 includes receiving 16-bit and 32-bit data. Individual waveform sampling channels in the art are 16-bit, but some metrics, such as spindle speed, are fundamentally a 32-bit quantity. If at least two spare channels are available on a machine 16, two channels are recombined to 32-bit within the adapter 20. The selective bit sampling is accomplished through a bit shift feature available in the API of the machine 16. If there are not two spare channels available, a single fixed bit shift is applied, to sample a specific or optimal 16-bit section, depending on the machine 16 and the priorities of the metrics as set forth herein.

Figure 3:
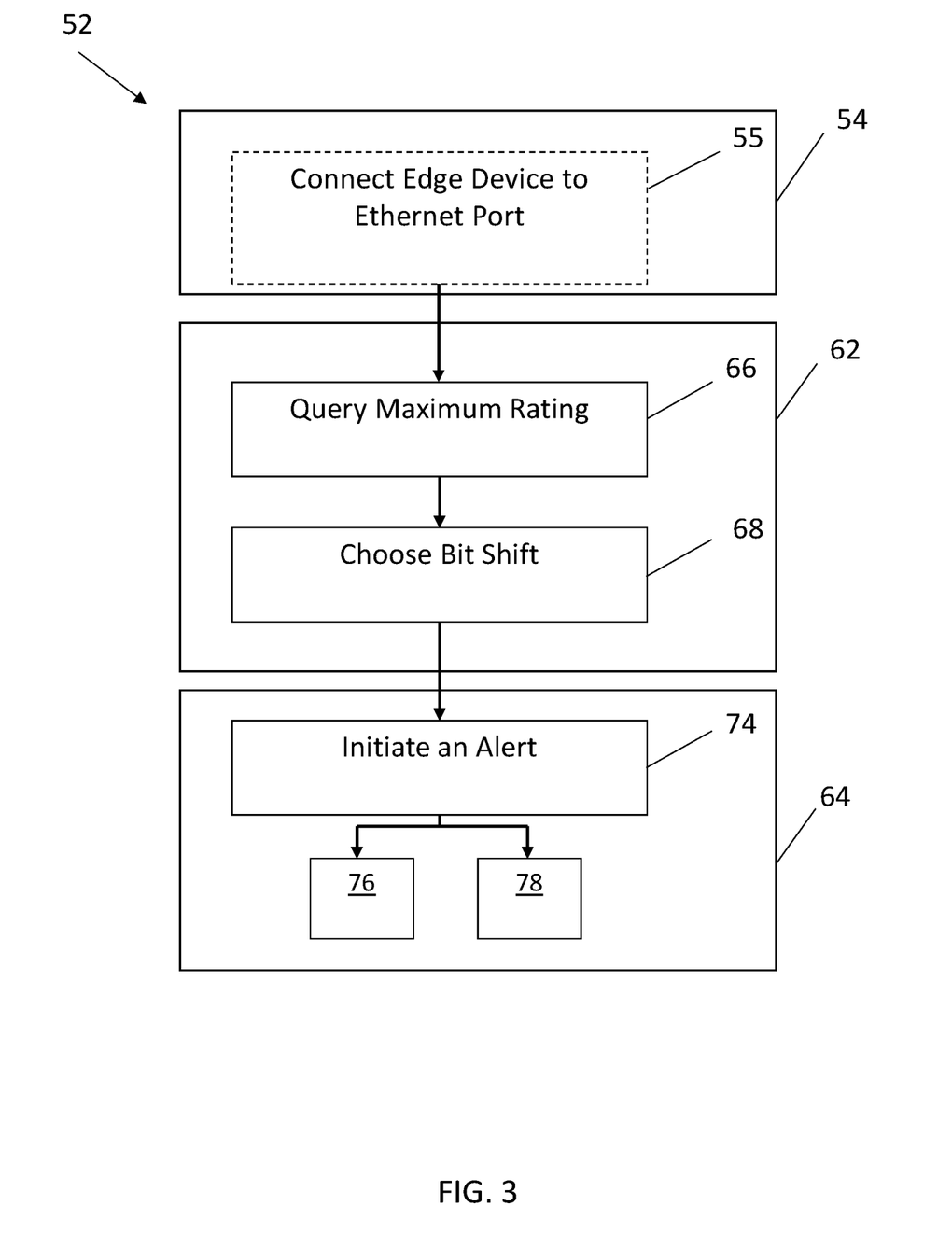
FIG. 3 is another flow chart depicting a portion of the method of FIG. 2, in accordance with an embodiment of the present invention.

Referring now to FIG. 3, the adapter 20 automatically determines the amount of the bit shift by first querying 66 the maximum rating of the associated element of the machine 16, e.g., the maximum rated speed of the associated spindle motor, and choosing 68 a bit shift such that a range of values up to the maximum rating can be accurately represented. Sacrificing lower bits improves the resolution of the single bit shift. The interfacing 54 includes connecting 55 the edge device 30 via an ethernet port 32.

Figure 4:
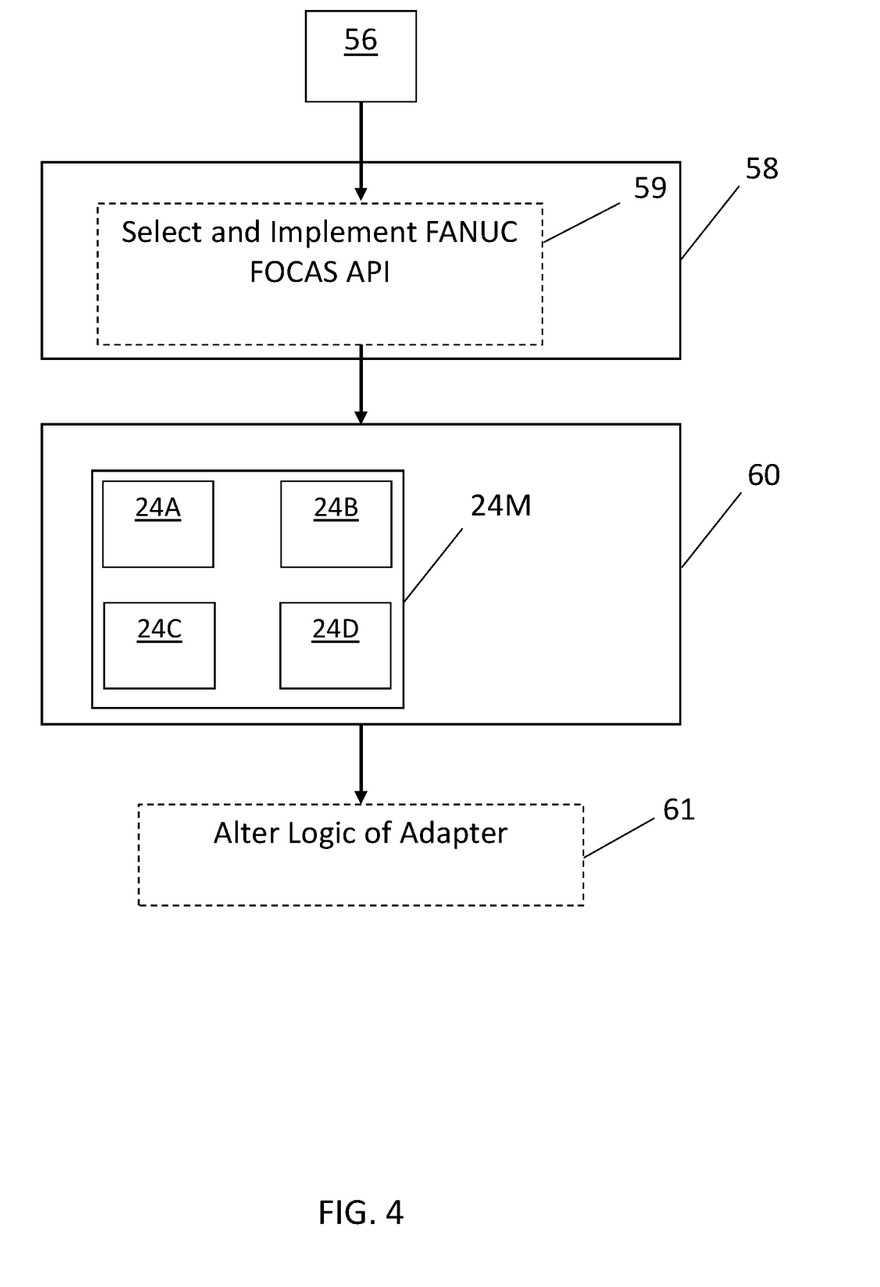
FIG. 4 is another flow chart depicting a portion of the method of FIG. 2, in accordance with an embodiment of the present invention.

Referring now to FIG. 4, the acquiring 60 control data includes a first collection thread 24A collecting and formatting the control data 12A, 12B, 12C, 12D on a continuous basis during normal machine 16 operation. The acquiring 60 may also include one or more additional parallel collection threads 24B, 24C, 24D establishing supplemental context-setting data items 12B, 12C, 12D including engaged tool number, part counter, motion commands, and/or general execution status. The supplemental context-setting data items 12B, 12C, 12D from these parallel threads 24B, 24C, 24D are synthesized within the adapter 20 and/or served to other programs.

In embodiments, the first collection thread 24A implements waveform sampling that is onboard the machine 16. The first collection thread 24A repeatedly requests 58 waveform data 12A via an API function call and receives 60 waveform data 12A in chunks of time samples. Approximately 100 time samples corresponding to approximately 100 milliseconds per chunk are implemented, but the size of the chunk is limited by the machine 16 (the size of the chunk varies depending on the machine 16). The call and response process of the first collection thread 24A continues indefinitely and uninterrupted as long as the connection remains valid.

Figure 5:
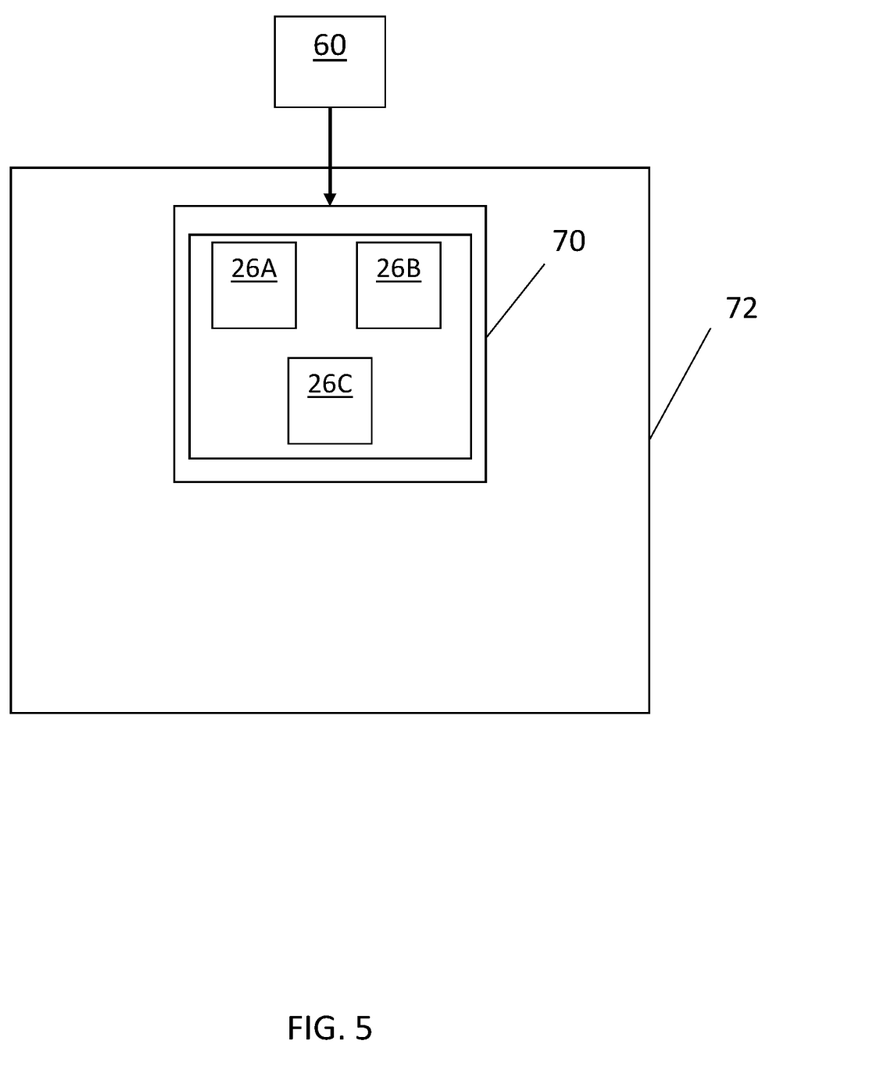
FIG. 5 is another flow chart depicting a portion of the method of FIG. 2, in accordance with an embodiment of the present invention.

Referring now to FIG. 5, the adapter 20 timestamps 72 the waveform data items 12A in order to correlate the waveform data items 12A with other events on or involving the machine 16 (i.e., tool changes, motion commands, operator annotations, etc.). Three complications impact the ability to accurately timestamp the waveform data items 12A. First, the samples 12A are nominally one per millisecond, but actual sampling time has been measured to deviate from true milliseconds by up to +/−50 parts per million (by different amounts/signs on different machines 16). Timestamping based on sampling start time plus the number of samples is therefore not reliable over long time scales (50 ppm corresponds to about 4 seconds of clock drift per day). Second, timestamping based on the return time of the API function call 15 cannot be relied upon because of unpredictable machine processing and network lags. These unpredictable lags may occasionally be up to several seconds per call. Third, timestamping based on the start time of the API function call 15 cannot be relied upon on its own, due to the unpredictable lags in previous calls. As a result, the onboard buffer of the machine 16 may have a backlog of data 12A and the returned data chunk would correspond to older data that was generated before the call.

Referring to FIG. 5, the adapter 20 overcomes the aforementioned complications and the first collection thread 24A ensures robustness of the timestamping process by buffering 70 the received data 12A in memory until the data reading process of the adapter 20 is verifiably caught up to the data writing process of the machine 16 according to criteria 26 established by the logic 22. At this point, the timestamp of the most recent sample 12A is then set to the most recent API function 15 return time. Intermediate timestamps are filled in assuming uniform time steps since the end of the previous buffer 70 (or of the sampling start time if this is the first buffer 70 filling). The buffer 70 of the adapter 20 is then flushed and the samples 12A sent to output 80.

In one embodiment, the adapter 20 continues buffering 70 until a minimum sample count is reached to smooth out remaining fluctuations in sample delivery time. In testing, several thousand samples over the course of several seconds worked well to keep the time steps uniform to the part per microsecond level.

Referring to FIG. 6, the first criteria 26A establishing when the adapter 20 is "caught up" compares the time durations 21 of the API function calls 15 to the number of received samples. Specifically, the adapter 20 is caught up when the call duration 21 (in milliseconds) is close to the number of returned samples (with a reasonable margin of approximately 10 milliseconds). For example, if the data chunk is always 100 samples and the onboard data buffer 17 of the machine 16 has 200 samples in it when the API function call 15 is made then the machine 16 will return only the oldest 100 samples with a typical response time (accounting for both processing and networking delays) of 20-40 milliseconds. If, on the other hand, the onboard data buffer 17 has 50 samples in it when the API function call 15 is made, then the machine 16 will wait until its onboard buffer 17 accumulates a full 100 samples and then release them. Even with a fast network connection and minimal network lag, the duration of the API function call will be close to 100 milliseconds and the true time of the oldest sample will be close to the API function return time. A second criteria 26B is that the summed durations 21 of previous calls 15 match the summed sample counts, to within a comparable margin. The second criteria 26B helps to prevent imprecisions in timing and "lucky" network lags that can fool a single-call criteria into premature timestamping. The clocks and count for the criteria 26A, 26B, reset whenever both criteria 26A, 26B are met and the samples are timestamped.

Referring now to FIG. 4, the adapter 20 runs additional data collection threads 24B, 24C, 24D in parallel to the first collection thread 24A (dedicated to waveform sampling data 12A). The additional data collection threads 24B, 24C, 24D utilize other API functions that return discrete snapshots of various aspects of the state of the machine 16 (at 10-1000 millisecond scales). The returned data items 12B, 12C, 12D are timestamped as they are gathered 60. In the embodiment depicted in FIG. 1, the adapter 20 includes a first collection thread 24A that collects waveform sampling data 12A on the millisecond scale, as described herein with reference to FIG. 4, a second collection thread 24B that collects control data 12B in the form of modal machine variables (i.e., tool number, motion command number, miscellaneous (M) function number, etc.), a third collection thread 24C that collects information 12C from the part counter and operation status (i.e., active, optional stop, emergency stop, etc.) of the machine 16, and a fourth collection thread 24D that collects a broad spectrum of other control data 12D in the form of supplemental data items (i.e., controller mode, feed/speed override values, tool offset values, etc.). The second collection thread 24B samples continuously as fast as the machine 16 allows, typically acquiring an update of all variables every 10-100 milliseconds. The third collection thread 24C operates with a preprogrammed collection cycle delay of a few hundred milliseconds to reduce the computational burden placed on the machine 16 and to free up resources for the other collection threads 24A, 24B, 24D. The collection cycle of the fourth collection thread 24D operates with a one second delay. Control data 12A, 12B, 12C, 12D, 12D from all four collection threads 24A, 24B, 24C, 24D are continuously piped into the master thread 24M of the adapter 20. In some embodiments, the control data 12A, 12B, 12C, 12D, 12D is also streamed locally on the edge device 30 or to other locally connected devices for use in custom applications in real time and/or uploaded to the cloud for combined analysis offline.

The control data 12A, 12B, 12C, 12D includes, but is not limited to, computer numerically controlled (CNC) machine spindle speed. The parallel collection threads 24A, 24B, 24C, 24D include, but are not limited to, modal machine variables, part counter, operational status, and supplemental data items.

In embodiments, the sampling rate the sampling rate exceeds 1 KHz.

In embodiments, the method 52 includes converting the control data 12A, 12B, 12C, 12D to a machine readable format.

Referring to FIG. 3, the querying 58 the machine 16 includes the adapter 20 selecting and implementing 59 components of a FANUC FOCAS API. In embodiments, the method 52 also includes altering 61 the set logic 22 of the adapter 20.

Referring now to FIG. 4, the method 52 includes initiating 74 an alert depending on the measured control data 12A, 12B, 12C, 12D, 12D. For example, the method 52 includes initiating 76 an integrator when the acquired control data 12A, 12B, 12C, 12D indicates a prespecified tool number; and initiating 78 an action to the machine 16 based upon a sum of load measurements from the control data 12A, 12B, 12C, 12D provided by the integrator if the sum exceeds a predefined threshold value.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, as previously mentioned, the system may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method of monitoring a condition of a machine in real time, the method comprising:
   interfacing an edge device the machine;
   requesting a handle from a controller of the machine;
   querying the machine with an adapter of the edge device for a control data;
   acquiring the control data from one or more sensors of the machine;
   initiating an integrator when the acquired control data indicates a prespecified tool number;
   initiating an action to the machine based upon a sum of load measurements from the control data provided by the integrator in response to the sum exceeding a predefined threshold value; and
   repeating the steps of querying for the control data and acquiring the control data after a period of time at a high frequency defined by a sampling rate,
   wherein during an initial connection period the adapter cycles through a set logic of repeating the steps of querying the machine and acquiring the control data to establish the sampling rate.

2. The method of claim 1, wherein the sampling rate exceeds 1 KHz.

3. The method of claim 1, wherein the interfacing comprises connecting the edge device to the controller via an Ethernet port.

4. The method of claim 1, wherein the querying of the controller further comprises the adapter selecting and implementing components of an application programming interface (API).

5. The method of claim 1, wherein the acquiring of the control data comprises a first collection thread collecting and formatting the control data on a continuous basis during normal machine operation.

6. The method of claim 1, wherein the acquiring further comprises one or more additional parallel collection threads establishing supplemental context-setting data items including engaged tool number, part counter, motion commands, and/or general execution status.

7. The method of claim 6, wherein the supplemental context-setting data items from these parallel threads are synthesized within the adapter and/or served to other programs.

8. The method of claim 1, further comprising converting the control data to a machine readable format.

9. The method of claim 1, further comprising altering the set logic of the adapter.

10. The method of claim 1, wherein the acquiring comprises receiving 16-bit and 32-bit data.

11. The method of claim 1, wherein the control data is a computer numerically controlled (CNC) machine spindle speed.

12. The method of claim 1, wherein the acquiring comprises collecting at least one additional data thread selected from a group comprising of modal machine variables, part counter, operational status, and supplemental data items.

13. The method of claim 1, wherein the acquiring of the control data further comprises measuring a call duration by repeatedly requesting and delivering a number of samples via an application programming interface (API) function call and buffering the control data acquired from the one or more sensors until a duration of the API function call in milliseconds approaches the number of delivered samples.

* * * * *